United States Patent [19]

Douglas

[11] Patent Number: 4,537,136
[45] Date of Patent: Aug. 27, 1985

[54] PIPELINE VEHICLE

[75] Inventor: Brian Douglas, Dunfermline, Great Britain

[73] Assignee: Subscan Systems Ltd., Great Britain

[21] Appl. No.: 460,788

[22] Filed: Jan. 25, 1983

[30] Foreign Application Priority Data

Feb. 2, 1982 [GB] United Kingdom ............... 8202978

[51] Int. Cl.³ .................................................. B61B 13/10
[52] U.S. Cl. ..................... 104/138 G; 118/DIG. 10;
254/106; 254/134.6; 378/60
[58] Field of Search ................... 15/104.05, 104.16;
104/138 R, 138 G; 105/365, 32; 378/60;
254/106, 134.5, 134.6; 33/178 F, 302; 72/466;
118/105, 254, 306, 408, DIG. 10; 299/31

[56] References Cited

U.S. PATENT DOCUMENTS

| 2,518,330 | 8/1950 | Jasper et al. | 254/134.5 |
| 2,727,722 | 12/1955 | Conboy | 254/134.6 |
| 3,047,270 | 7/1962 | Moore, Jr. | 254/134.6 |
| 3,099,227 | 7/1963 | Bryan | 104/138 G |
| 3,224,734 | 12/1965 | Hill | 254/134.6 |
| 4,244,296 | 1/1981 | Vertut | 104/138 G |

FOREIGN PATENT DOCUMENTS

| 611558 | 3/1935 | Fed. Rep. of Germany ... 254/134.6 |
| 1500664 | 9/1967 | France . |
| 2355236 | 1/1978 | France . |
| 1124732 | 8/1968 | United Kingdom . |

Primary Examiner—Robert B. Reeves
Assistant Examiner—David F. Hubbuch
Attorney, Agent, or Firm—Murray, Whisenhunt & Ferguson

[57] ABSTRACT

The vehicle has front and rear sets of wheels (24) carried on sprung arms (20). Each wheel can be locked by a clutch (26). One set of wheels is locked while a ram (32) is operated, causing the other set of wheels to roll forward. The main body (10) of the vehicle can be rotated relative to the wheels (24) by means of a motor (48) operating via a drive belt (50). The interior of the body (10) is pressurized with inert gas, suitably nitrogen exhausted from the propulsion system which is vented by a one-way valve 38.

5 Claims, 3 Drawing Figures

PIPELINE VEHICLE

DESCRIPTION

This invention relates to a self-propelled vehicle for use in pipelines and the like, for inspection or repair purposes.

It is known to inspect pipelines by means of an apparatus which propels itself along the pipe, and carries television, ultrasonic or other inspection equipment. However, known apparatus of this type has difficulties in obtaining sufficient grip on the pipe wall to ensure propulsion and being able to pass obstacles on the wall.

Reference is made to the following published patent documents:
FR - A No. 2 355 236 (Rouland)
U.S. Pat. No. 3,047,270 (Moore)
U.S. Pat. No. 2,518,330 (Jasper)
GB - A No. 1 124 732 (Chicago Pneumatic)

It is known from such prior art, particularly U.S. Pat. No. 2,518,330, to provide a vehicle which can travel through a pipe or conduit by means of forward and rear wall-engaging means mounted on a main body and alternately operable to grip the wall, together with means operable to axially extend and retract the wall engaging means relative to each other in synchronism with the wall-engaging means to cause the vehicle to advance stepwise in the pipe.

Such known apparatus has two main disadvantages. One is that it is not easy to adapt to varying diameters of pipe, each vehicle essentially being for a predetermined pipe size. The other is that the vehicle is not capable of traversing any wall irregularity or other obstruction of more than very small dimensions.

A primary object of the present invention is accordingly to provide an improved means of propelling an inspection apparatus.

The present invention meets the above problems by providing a pipeline vehicle in which each wall engaging means carried by the body and alternately operable to grip the wall of a pipe, and reciprocable power means operable to extend and retract the wall engaging means relative to each other in synchronism with gripping of the wall so as to cause the vehicle to advance stepwise; characterised in that each wall engaging means comprises a plurality of wheels biased towards the wall for engagement therewith to support the vehicle and in that each wheel is provided with braking means operating in synchronism with the reciprocable power means to cause the wheels of one wall engaging means to grip the wall while the wheels of the other wall engaging means are free to roll on the wall.

An embodiment of the invention will now be described, by way of example only, with reference to the accompanying drawings, in which.

Figure 1:
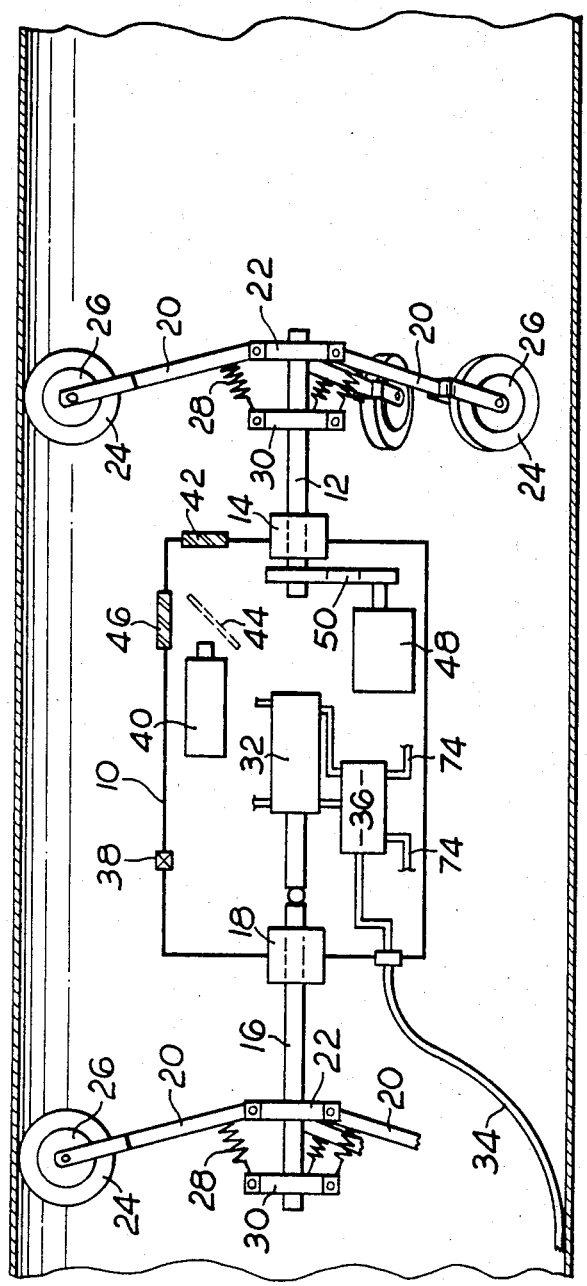
FIG. 1 is a side view, partly in section, of one apparatus embodying the invention.

The apparatus has a body 10 in the form of a cylindrical tank. A front shaft 12 extends forwardly of the body 10 and is mounted by a bearing 14 which permits relative rotary movement but not axial movement. A rear shaft 16 extends from the opposite end of the body 10, and is mounted in a bearing 18 which permits relative movement both rotationally and axially; suitably the shaft 16 is of hardened steel and the bearing 18 is a recirculatory ball bearing.

Each shaft carries a wheel assembly comprising arms 20 hinged at their inner ends to a bush 22 fixed to the shaft. Each arm is forked at its outer end to mount clutch unit 26 carrying a wheel 24. The arms 20 are biased by springs 28 towards a position inclined to the respective shafts by about 75°. The springs 28 of each assembly are hinged to a common collar 30 slidable on the shaft. The wheel assembly thus resembles the frame of an umbrella. The arms 20 are thus urged equally outwardly to bring the wheels 24 into contact with the inner wall of a pipe to be inspected with the body 10 centrally within the pipe. The arms may be adjustable to accommodate different pipe sizes; for example they may be telescopic.

The rear shaft 16 can be reciprocated in the bearing 18 by means of a piston-and-cylinder unit or ram 32. The ram 32 is actuated via a control valve 36 by nitrogen at 150 psi supplied via an umbilical connection 34. The control valve 36 also operates the clutches 26 selectively. The sequence is such that for travel in the forward direction A the rear wheels are locked, the ram 32 is extended thus driving the body 10 forward, rolling on the front wheels, and then the front wheels are locked and the rear wheels are freed while the ram 32 is retracted. For reverse travel this sequence is reversed. The control valve 36 may be operated by solenoids (not shown) controlled via conductors in the umbilical 34.

Exhaust nitrogen from the ram 32 and clutches 26 is vented to the interior of the body 10, and thence via a one-way valve 38 to the pipeline. The body 10 is thus filled with intrinsically safe gas, and is at a higher pressure (determined by the valve 38) than the pipeline, preventing ingress of contaminants.

Because of the manner in which the legs 20 are mounted, the pressure exerted by the ram 32 when travelling in the forward direction exerts a high force urging the locked wheels against the pipe wall. This to a large degree overcomes problems caused by oil, wax or the like on the pipe wall, and gives traction much superior to that obtained by driven wheels.

The body 10 may contain any suitable inspection equipment, for example a television camera 40 which can view longitudinally through a window 42 or radially via a motorised mirror 44 and window 46. The body 10 may be rotated on the shafts 12,16 by a motor 48 and drive belt 50 to bring the camera 40 or other inspection equipment to a desired radial position.

The springs 28 could be replaced by gas cylinders, which could be controllable to assist in passing restrictions in the pipe. As an alternative to the motor 48 and belt 50, rotation may be effected by a stepper motor driving via a worm gear; this allows very accurate rotational indexing, and the worm gear prevents unintentional rotation due to any weight imbalance.

Communication between the vehicle and a surface control station is preferably via optical fibres in the umbilical, which renders the system inherently safe for use in explosive atmospheres. Local power for electrical equipment in the vehicle can be provided by an on-board battery, preferably of flameproof type.

Figure 2:
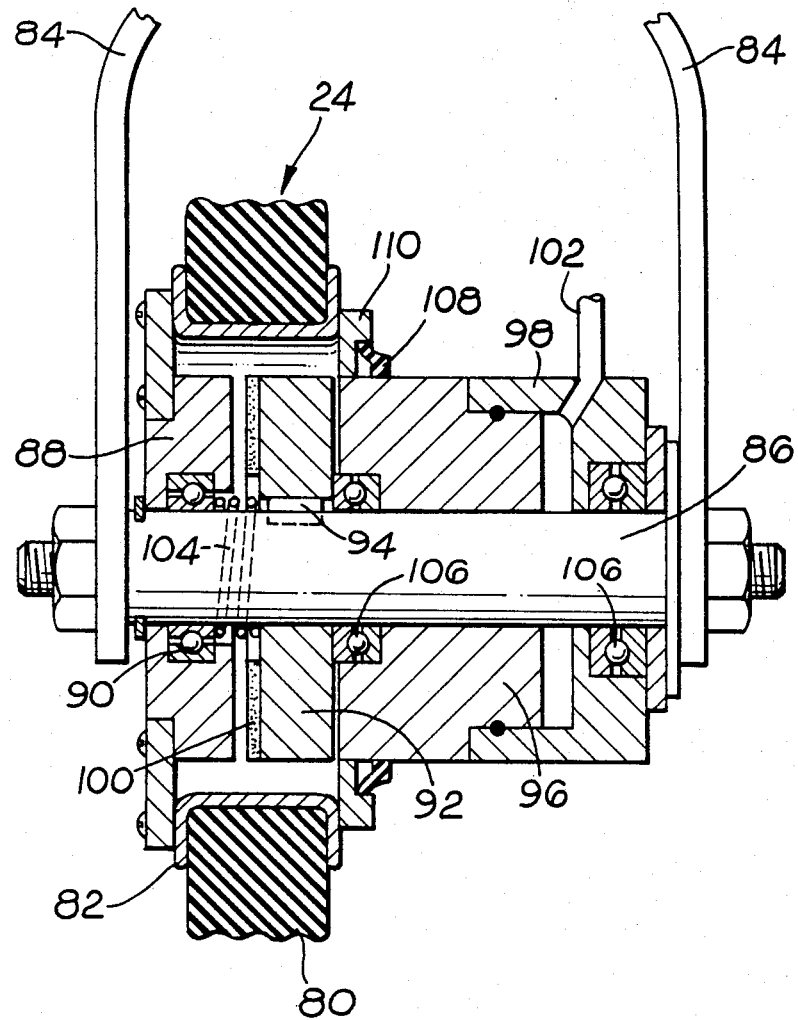
FIG. 2 is a detailed cross-section of a gas-operated clutch device suitable for use in the apparatus of FIG. 1.

FIG. 2 shows in detail the arrangements for mounting and controlling one wheel 24. The wheel comprises a rubber tire 80 secured to a rim 82. A support fork 84 secured to the arm 20 of FIG. 1 has a shaft 86 non-rotatably secured thereto. The wheel rim 82 is secured to a hub 88 which is journalled by ball-bearing 90 for rotation on the shaft 86. The clutch 26 comprises a plate 92 fixed rotationally by a key 94 and axially slidable on the shaft 86. A piston 96 is axially movable in a cylinder 98, and the other face of the piston 96 carries a friction material 100.

Gas introduced at 80-100 psi through conduit 102 forces the piston 96 to the left, thus bringing the friction material 100 into contact with the wheel hub 88. A return spring 104 returns the plate 92 and piston 96 when the gas pressure is removed. The piston and cylinder are provided with thrust bearings 106.

A circumferential seal 108 engages a rubbing plate 110 to prevent ingress of pipeline materials into the wheel hub and clutch region.

One advantage of using gas-powered clutches of this type is that, in the event of power failure, the wheels are free to rotate and the vehicle can be pulled out by the umbilical. If, however, the vehicle is used for climbing vertically such a power loss would cause it to fall freely. To deal with this a low-pressure gas reservoir could be provided to provide partial braking and thus limit speed of fall, or a hydraulic governor could be coupled to one or more wheels.

Figure 3:
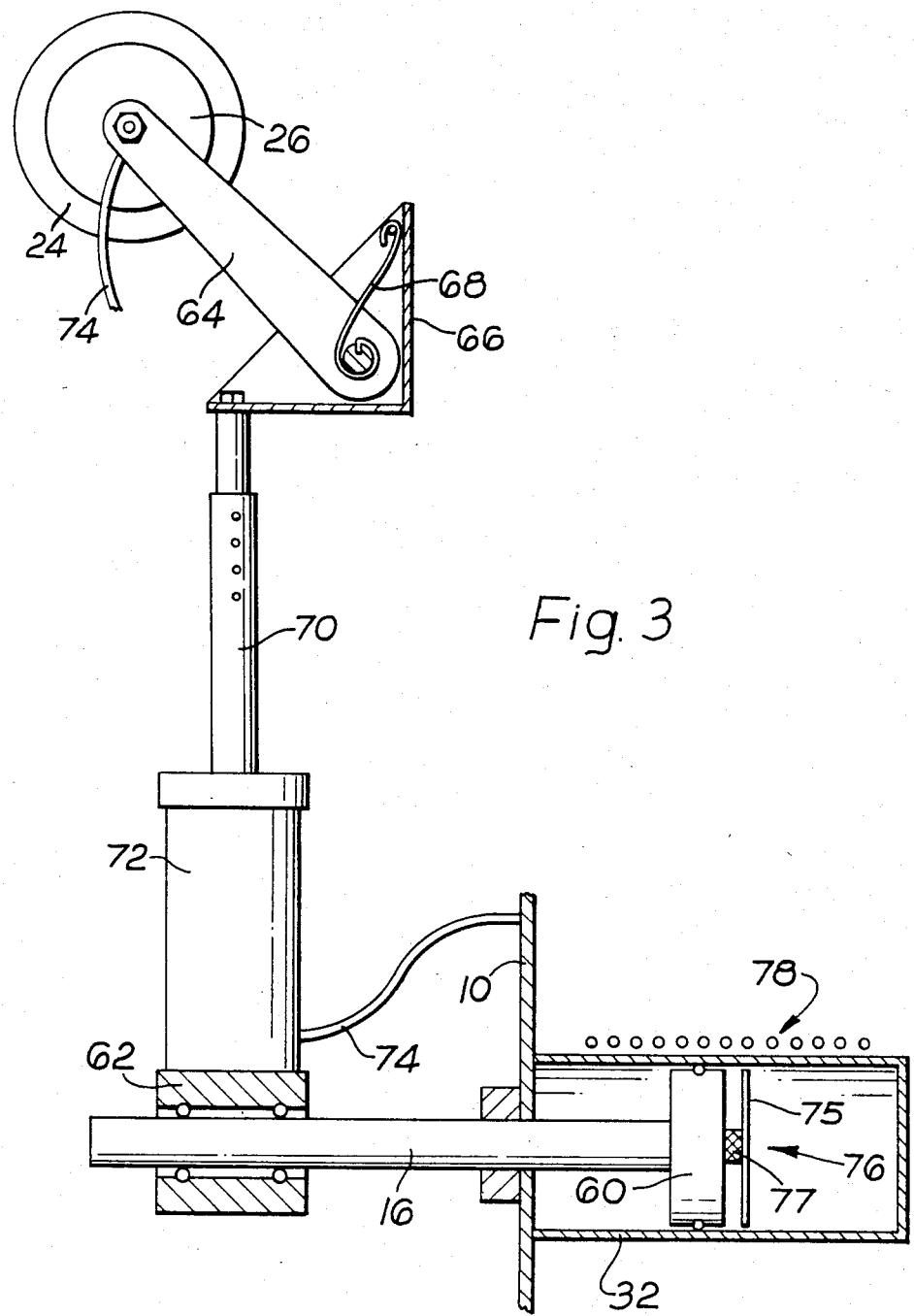
FIG. 3 is a side view of part of a modified embodiment.

FIG. 3 illustrates a modified arrangement for mounting the wheels 24. In FIG. 3 like reference numerals are used for like parts to those of FIG. 1. In this embodiment, the rod 16 is directly connected to piston 60 of ram 32 and cannot rotate with respect to the body 10. The wheels 24, only one of which is shown, are mounted on a ring 62 journalled for roation on the rod 16. Each wheel 24 is mounted via associated clutch 26 on a swing arm 64 rotatably mounted on a bracket 66 and outwardly biased by a spring 68. The bracket is carried on a radial arm 70 drivable by a gas-powered ram 72. The arm 70 is suitably adjustable in length, which allows the vehicle to be readily adapted to various sizes of pipe. In use, the ram 72 is normally pressurized to a predetermined level to provide a given level of pretension on the wheel 24. If an obstacle is encountered, however, the rams 72 of all wheels of a set, or a selected one of the set, can be depressurized to reduce the effective vehicle diameter and thus aid in passing the obstacle. The clutch 26 and ram 72 are connected by hoses indicated at 74 to the control valve 36.

Also illustrated in FIG. 3 is a means for monitoring movement of the piston 60 to allow remote control of fine incremental positioning in the axial direction. The piston 60 carries a magnet assembly 76 which cooperates with a linear array of Hall effect sensors 78. The assembly 76 comprises a permanent magnet 77 coupled with a disc 75 of magnetic material. The sensors 78 may be connected to any suitable circuitry (not shown) as will be apparent to those skilled in the art to provide a precise indication of the axial position of the piston 60. This allows the vehicle to be moved axially in accurate small incremental steps for detailed examination of the pipe. Suitably also, the rotation of the vehicle body 10 is monitored, e.g. by a shaft encoder (not shown).

The modified embodiment of FIG. 3 has the advantage of providing a substantially constant spring force on the wheels for a wide range of pipe diameters. It also allows the overall length of the vehicle to be reduced in comparison with FIG. 1, with a consequent improvement in ability to negotiate bends.

I claim:

1. A pipeline vehicle comprising a body, forward and rear wall engaging means carried by the body and alternately operable to grip the wall of a pipe, and reciprocable power means operable to extend and retract the wall engaging means relative to each other in synchronism with gripping of the wall so as to cause the vehicle to advance stepwise; and in which each wall engaging means comprises a plurality of wheels biased towards the wall for engagement therewith to support the vehicle, and each wheel is provided with braking means operating in synchronism with the reciprocable power means to cause the wheels of one wall engaging means to grip the wall while the wheels of the other wall engaging means are free to roll on the wall.

2. The vehicle of claim 1, in which the body is mounted for rotation with respect to the wall-engaging means about the pipe axis, and including means for driving the body in axial rotation.

3. The vehicle of claim 1 or claim 2, in which the reciprocable power means comprises a gas-operated ram and the braking means are gas-operated.

4. The vehicle of claim 3, including an umbilical connection between the vehicle and a supply of pressurised inert gas, and in which gas from the ram is exhausted into the interior of the body which is gas-tight and is provided with a one-way venting valve, to provide a positive-pressure inert atmosphere in said interior.

5. The vehicle of claim 4, in which the umbilical connection includes a fibre optic communication channel providing signal communication between the vehicle and a control station.

* * * * *